April 24, 1962    F. S. ROBERTS    3,031,325
UNDERLAY FOR RUGS AND CARPETS
Filed April 7, 1959
FIG. 1
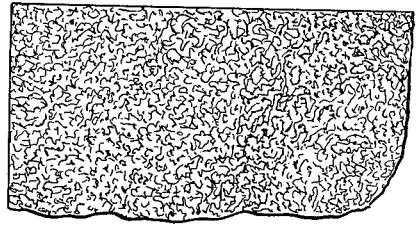
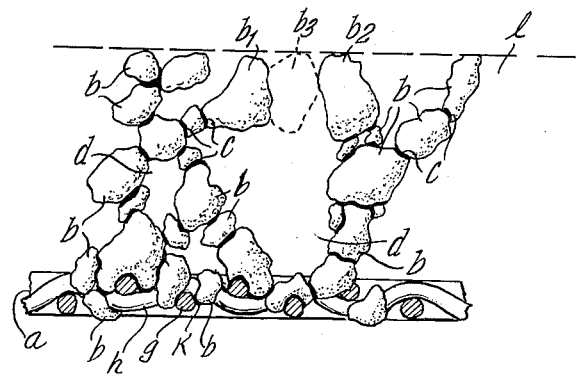
FIG. 2
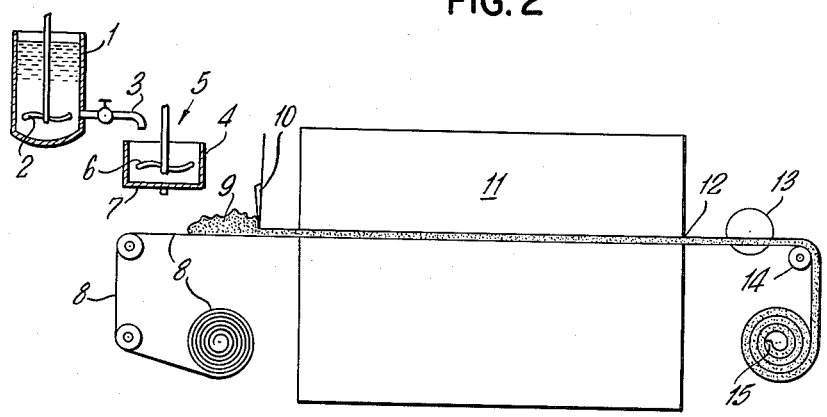
FIG. 3
INVENTOR.
FRANK S. ROBERTS
BY United States Patent Office 3,031,325
Patented Apr. 24, 1962

3,031,325
UNDERLAY FOR RUGS AND CARPETS
Frank Somerville Roberts, Bramhall, England, assignor, by mesne assignments, to Durie & Miller of Canada Limited, a corporation of Canada
Filed Apr. 7, 1959, Ser. No. 804,790
Claims priority, application Great Britain Nov. 16, 1953
10 Claims. (Cl. 117—16)

This invention relates to an underlay for rugs and carpets and this application is a continuation in part of the application of Frank S. Roberts, Serial No. 468,921, filed November 15, 1954, entitled Process of Producing Rubber Latex Dispersion Containing Rubber Crumb Granules, now U.S. Pat. No. 2,882,327.

The underlay for rugs and carpets comprising the present invention includes a sheet or band consisting of particles of granular material of an organic nature, which granules are bonded together locally in the form of straight and branched chains to present a large number of intercommunicating cavities open to the atmosphere, some of which extend through the entire depth of the layer of composition and wherein the sheet or band has particles thereof extending into a fibrous backing material with the sheet-like mass being cohesively bonded to the particles extending into the fibrous backing material.

Whilst the material of the present invention is capable of numerous industrial and domestic uses, it is particularly suitable for use as an underlay for carpets and other floor coverings and in fact it may be secured or applied to the underside of carpet material, thus permitting the carpet material to be cut to any desired pattern without the necessity of subsequently binding the edges thereof.

The process of the present invention for producing the aforesaid material, broadly comprises incorporating with a foamable aqueous solution or suspension of a natural or synthetic resin adhesive, a granular material of organic nature, such as rubber crumb, in the proportion of between 2 and 14 parts by volume of granular material to 1 part by volume of total resin content of the solution or suspension of adhesive, thereupon foaming the mix to form air bubbles each bounded by an envelope of aqueous adhesive, thereafter drying the foamed mixture in the form of a layer under such conditions that before the granules have begun to settle out, the envelopes enclosing said air bubbles are destroyed and said granules are bonded together locally by the resin of the destroyed envelopes, in the form of straight and branched chains to present a large number of intercommunicating cavities open to the atmosphere.

From the foregoing it will be seen that the product of the present invention is essentially different from normal cellular rubber in which the foamed condition is maintained in the solid state in contradistinction to which, in accordance with the present invention, the structure of the air-enclosing envelopes is gradually destroyed.

Contrary to expectation, it has been found that the granular material does not pack down at all during the destruction of the foam and that the cavities hereinbefore referred to remain when the material has become dry.

The granular material employed in carrying out the invention is preferably rubber crumb, although it may also be for example cork or saw-dust.

A particularly suitable material for the purpose of the present invention is waste rubber crumb obtained by grinding up for example the rubber of used motor car tires and normally employed in the manufacture of rubber soles and heels.

The adhesive employed preferably consists of a rubber latex mix containing the usual additional ingredients such as stabilizers, vulcanizing ingredients and the like. However, it is also possible to employ synthetic rubber latices, such as neoprene, G.R.S. styrene-butadiene copolymer mixtures or artificial latices of natural, synthetic or reclaimed rubber.

In addition, it is possible to employ aqueous suspensions of synthetic resins, such as polyvinyl chloride or polyvinyl acetate.

The foaming may be effected by any suitable means, for example, by mechanical whisking or stirring or by conventional chemical foam-producing agents.

An important advantage resulting from the use of the present invention is that a carpet or rug underlay produced in accordance with the invention will have a much greater life expectancy than prior type materials used for the same purpose and that the fibrous backing material will be rigidified by the presence of the particles or granules of rubber crumb or other material which are, because of the manner of producing the invention, firmly fixed and bonded by the fibers of the backing material.

An object of the invention is therefore to produce an underlay for rugs and carpets which is strong and durable, which maintains its elasticity for an unexpected long period of time, and which is provided with a backing material having granules of rubber crumb or similar material bonded between the fibers so as to permit the sheet-like mass of the substantially homogeneous material to be cohesively bonded to the particles or granules.

These, together with the various ancillary objects, features and advantages of the invention, which will become apparent as the following description proceeds, are attained by this underlay for rugs and carpets, a preferred embodiment being shown in the accompanying drawing, by way of example only, the drawing also indicating an apparatus for carrying out the process of the invention, and wherein:

FIG. 1 is an illustration of a portion of the underlay for rugs and carpets comprising the present invention;

FIG. 2 is an enlarged sectional detail view showing diagrammatically a small portion of the product illustrated in FIG. 1 indicating the manner in which the granules are bonded together locally in the form of straight and branched chains and wherein granules extend between the fibers of the backing material, which fibers are also filled with particles of the dispersion used in the invention;

FIG. 3 is a diagrammatic illustration of one embodiment of the apparatus suitable for carrying the process of the present invention into practical effect.

Foam rubber underlays for carpets and rugs have heretofore been manufactured with the foam rubber being attached to the fibrous backing by means of a suitable adhesive. It is the concept of the present invention to apply a homogeneous sheet or mass to the fibrous backing in such a manner and with the homogeneous mass being of such materials that granules of relatively dense material as compared with the fibrous backing will extend between the fibers thus effectively rendering even the fibrous backing elastic and dense so that the fibrous backing will serve as an unusually effective protection for the cushion formed by the sheet-like mass and wherein the sheet-like mass is cohesively bonded to particles and granules locked within the fibers of the sheet-like mass so as to substantially prevent the backing from pulling away from the sheet-like mass.

In FIG. 2 there is shown a backing $a$ of jute or like material such as hessian and other fibrous weaves and indicated at $a$. This backing includes fibers $g$ and $h$ between which granules as at $b$ can extend. Other particles $k$ also extend between the fibers $g$ and $h$ as will become apparent hereinafter.

The granules $b$ are preferably formed of crumb rubber and extend throughout the homogeneous sheet or mass $l$ on the backing $a$. The granules $b$ are of irregular size and shape, which granules are interconnected locally by a bonding medium as indicated by the thickened lines $c$ in the form of straight and branched chains. The particles $k$ are formed of the bonding medium. It will be seen that at $d$, an air space is formed which extends throughout the depth of the finished composition but the granules $b^1$, $b^2$ are interconnected at the rear of the air space by the granule $b^3$.

It will thus be seen that the material of the present invention is entirely dissimilar from a sponge rubber structure.

In the embodiment of apparatus illustrated in FIG. 3, 1 denotes a mixer in which the adhesive mix is prepared and stirred by means of a stirrer 2. From the mixer 1, the adhesive mix issues through a valve-controlled conduit 3 into a foaming apparatus 4. Granulated rubber crumb is next introduced into the apparatus 4 at 5 and the mixture is foamed by means of a stirrer 6.

When the foam has been produced, the stirrer 6 is raised and the vessel 4 is tilted about a pivot 7 to discharge the foamed material onto a travelling fabric base 8 at 9. The foamed mixture then moves under a spreader or doctor blade 10 which ensures the application of a coating of uniform thickness on to the base 8.

In practice the thickness of the coating may vary between 1 mm. and about 120 mm.

The particles of adhesive mix which extend between the fibers will serve to cooperate with the rest of the mass to cohesively bond the mass to the fibrous backing $a$. A number of particles $b$ extend between the fibers and densify as well as elasticize the backing material $a$.

The coated base then travels through a drying chamber 11 where it is dried at a temperature of for example 95 to 105° C. in order to prevent skin formation on the surface of the mix.

The dry coated material issues from the drying chamber 11 at 12 and passes between two trimming knives 13 (only one of which is shown) which trim the edges thereof, after which the material passes over rollers 14 and is wound up at 15.

According to one embodiment of the invention, a rubber latex mix consisting of parts by weight of the following ingredients:

*Example 1*

130 parts of concentrated rubber latex known under the registered trademark "Revertex";
50 parts of reclaim dispersion;
2.5 parts of sulphur;
0.75 part of zinc diethyldithiocarbamate;
5 parts of zinc oxide;
100 parts of 5% sodium alginate aqueous solution;
25 parts of 10% casein aqueous solution; and water as required for viscosity adjustment;

formed in the mixer 1 was introduced into the apparatus 4 whereupon 200 parts by weight of a light red rubber crumb corresponding to 2.4 parts by volume of the volume of the rubber in the latex mix was introduced into the mix at 5 whilst stirring vigorously to produce air bubbles in the mix. When the mixing had been completed the vessel 4 was tilted to deposit the batch at 9 on a backing 8, for example, jute or hessian. The mix was then uniformly spread on the backing 8 by the spreader 10, whereupon the coated backing was moved into the heated drying chamber 11 where it was slowly dried at a temperature of for example 95 to 105° C. in a moist atmosphere in order to prevent skin-formation on the surface of the mix.

According to another embodiment of the invention a rubber mix consisting of the following ingredients:

*Example 2*

58.9 kgs. of the concentrated rubber latex known under the registered trademark "Revertex"
24.95 kgs. of black reclaim dispersion
10.42 kgs. of stabilizer
73.4 ccs. of a 10% solution of a sulphonated fatty alcohol
208.9 grams of a sodium salt of a polymerized alkyl-aryl sulphonic acid
998 grams of sulphur
998 grams of zinc diethyldithiocarbamate
998 grams of mercaptobenzothiozole
1995 grams of zinc oxide
99 grams of bentonite
293 grams of an antioxidant
41.8 kgs. of a 5% aqueous solution of sodium alginate
41.8 kgs. of a 10% aqueous solution of casein; and water as required for viscosity adjustment;

was formed in the mixer 1. 60.6 kgs. of granulated cork (corresponding to approximately 5 parts by volume of the rubber in the latex mix) were then introduced into the mix at 5 whilst stirring vigorously to produce air bubbles in the mix. The mix was thereupon spread on to a backing and the coated backing slowly dried in the manner hereinbefore set forth.

Other examples employing natural rubber latex are as follows:

*Example 3*

| | Parts by weight |
|---|---|
| Revertex (natural rubber latex) | 130 |
| Reclaim rubber dispersion | 50 |
| Sulphur | 2.5 |
| Zinc diethyldithiocarbamate | 1.0 |
| Zinc oxide | 5.0 |
| Antioxidant | 0.75 |
| 5% sodium alginate | 100 |
| 10% casein solution | 50 |
| Water as required. | |
| 20's mesh rubber crumb | 300 |

*Example 4*

| | |
|---|---|
| Revertex (natural rubber latex) | 130 |
| Reclaim rubber dispersion | 50 |
| Zinc diethyldithiocarbamate | 1.0 |
| Sulphur | 2.5 |
| Zinc oxide | 5.0 |
| Antioxidant | 0.75 |
| 10% casein solution | 120 |
| 5% sodium alginate | 100 |
| Water approx. | 200 |
| 20's mesh granulated cork | 150 |

*Example 5*

| | |
|---|---|
| Revertex (natural rubber latex) | 130 |
| Reclaim rubber dispersion | 50 |
| Zinc diethyldithiocarbamate | 1.0 |
| Sulphur | 2.5 |
| Zinc oxide | 5.0 |
| Antioxidant | 0.75 |
| 5% sodium alginate | 100 |
| 10% casein solution | 120 |
| Water approx. | 200 |
| 20's mesh sieved sawdust | 186 |

*Example 6*

| | |
|---|---|
| Revertex (natural rubber latex) | 130 |
| Reclaim rubber dispersion | 50 |
| Sulphur | 2.5 |
| Zinc diethyldithiocarbamate | 1.0 |
| Zinc oxide | 5.0 |
| Antioxidant | 0.75 |
| 5% sodium alginate | 100 |
| 10% casein solution | 50 |
| Water as required. | |
| Granulated plastic, sp. gr. 1.2 | 300 |

Example 7

| | Parts by weight |
|---|---|
| Revertex (natural rubber latex) | 130 |
| Reclaim rubber dispersion | 50 |
| Sulphur | 2.5 |
| Zinc diethyldithiocarbamate | 1.0 |
| Zinc oxide | 5.0 |
| Antioxidant (AgeRite White) | 0.75 |
| 5% sodium alginate | 100 |
| 10% casein solution | 50 |
| 20's mesh chopped straw | 200 |

Water as required for viscosity.

Example 8

| | |
|---|---|
| Revertex (natural rubber latex) | 130 |
| Reclaim rubber dispersion | 50 |
| Sulphur | 2.5 |
| Zinc diethyldithiocarbamate | 1.0 |
| Zinc oxide | 5.0 |
| Antioxidant | 0.75 |
| 5% sodium alginate | 100 |
| 10% casein solution | 50 |
| Pulverized rice husks | 250 |

Water as required for viscosity.

In lieu of the natural rubber latex, it has been found that a polyvinyl acetate emulsion can be employed to good effect and the following are examples of compositions in accordance with the invention employing polyvinyl acetate:

Example 9

| | Parts by weight |
|---|---|
| 50% polyvinyl acetate emulsion | 90 |
| Dibutyl phthalate | 10 |
| 2½% sodium alginate solution | 100 |
| Foaming agent | 5 |
| 20's mesh rubber crumb | 125 |

Water to adjust viscosity.

Example 10

| | |
|---|---|
| 50% polyvinyl acetate emulsion | 90 |
| Dibutyl phthalate | 10 |
| 2½% sodium alginate solution | 100 |
| Foaming agent | 5 |
| 20's mesh granulated cork | 40 |

Water to adjust viscosity.

Example 11

| | |
|---|---|
| 50% polyvinyl acetate emulsion | 90 |
| Dibutyl phthalate | 10 |
| 2½% sodium alginate solution | 100 |
| Foaming agent | 5 |
| 20's mesh sieved sawdust | 90 |

Water to adjust viscosity.

Example 12

| | |
|---|---|
| 50% polyvinyl acetate emulsion | 90 |
| Dibutyl phthalate | 10 |
| 2½% sodium alginate solution | 100 |
| Foaming agent | 5 |
| 20's mesh granulated plastics, sp. gr. 1.2 | 125 |

Water as required for viscosity.

Example 13

| | |
|---|---|
| 50% polyvinyl acetate emulsion | 90 |
| Dibutyl phthalate | 10 |
| 2½% sodium alginate solution | 100 |
| Foaming agent | 5 |
| 20's mesh chopped straw | 100 |

Water as required for viscosity.

Example 14

| | |
|---|---|
| 50% polyvinyl acetate emulsion | 90 |
| Dibutyl phthalate | 10 |
| 2½% sodium alginate solution | 100 |
| Foaming agent | 5 |
| Pulverized rice husks | 120 |

Water as required for viscosity.

Another synthetic emulsion, chloroprene, can be used and for example chloroprene sold under the name Neoprene Type 735 is employed in the following examples:

Example 15

| | Parts by weight |
|---|---|
| Neoprene Type 735 | 580 |
| 5% sodium alginate | 50 |
| 10% casein solution | 60 |
| Sulphur | 1.5 |
| Thiocarbanilide | 1.5 |
| Sodium pentamethylenedithiocarbamate | 1.5 |
| Zinc oxide | 45 |
| Water approx. | 250 |
| 20's mesh rubber crumb | 370 |

Example 16

| | |
|---|---|
| Neoprene Type 735 | 580 |
| 5% sodium alginate solution | 50 |
| 10% casein solution | 60 |
| Sulphur | 1.5 |
| Thiocarbanilide | 1.5 |
| Sodium pentamethylenedithiocarbamate | 1.5 |
| Zinc oxide | 45 |
| Water as required for viscosity approx. | 250 |
| 20's mesh granulated cork | 100 |

Example 17

| | |
|---|---|
| Neoprene Type 735 | 580 |
| 5% sodium alginate solution | 50 |
| 10% casein solution | 60 |
| Sulphur | 1.5 |
| Thiocarbanilide | 1.5 |
| Sodium pentamethylenedithiocarbamate | 1.5 |
| Zinc oxide | 45 |
| Water as required for viscosity approx. | 250 |
| 20's mesh sieved sawdust | 220 |

Example 18

| | |
|---|---|
| Neoprene Type 735 | 580 |
| 5% sodium alginate solution | 50 |
| 10% casein solution | 60 |
| Sulphur | 1.5 |
| Thiocarbanilide | 1.5 |
| Sodium pentamethylenedithiocarbamate | 1.5 |
| Zinc oxide | 45 |
| Water as required for viscosity approx. | 250 |
| 20's mesh granulated plastic, sp. gr. 1.2 | 350 |

Example 19

| | |
|---|---|
| Neoprene Type 735 | 580 |
| 5% sodium alginate solution | 50 |
| 10% casein solution | 60 |
| Sulphur | 1.5 |
| Thiocarbanilide | 1.5 |
| Sodium pentamethylenedithiocarbamate | 1.5 |
| Zinc oxide | 45 |
| Water as required for viscosity | 250 |
| 20's mesh chopped straw | 250 |

Example 20

| | |
|---|---|
| Neoprene Type 735 | 580 |
| 5% sodium alginate solution | 50 |
| 10% casein solution | 60 |
| Sulphur | 1.5 |
| Thiocarbanilide | 1.5 |
| Sodium pentamethylenedithiocarbamate | 1.5 |
| Zinc oxide | 45 |
| Water as required for viscosity approx. | 250 |
| Pulverized rice husks | 110 |

Nitrile (butadiene-acrylonitrile co-polymers, sold as

Hycar Type 1562) can be used as set forth in the following examples:

*Example 21*

| | Parts by weight |
|---|---|
| Hycar Type 1562 | 500 |
| 5% sodium alginate solution | 100 |
| 10% casein solution | 12.5 |
| Sulphur | 5 |
| Zinc dimethyldithiocarbamate | 5 |
| Zinc oxide | 12.5 |
| Water to adjust viscosity approx. | 500 |
| 20's mesh rubber crumb | 600 |

*Example 22*

| | |
|---|---|
| Hycar Type 1562 | 500 |
| 5% sodium alginate solution | 100 |
| 10% casein solution | 12.5 |
| Sulphur | 5 |
| Zinc dimethyldithiocarbamate | 5 |
| Zinc oxide | 12.5 |
| Water to adjust viscosity | 500 |
| 20's mesh granulated cork | 200 |

*Example 23*

| | |
|---|---|
| Hycar Type 1562 | 500 |
| 5% sodium alginate solution | 100 |
| 10% casein solution | 12.5 |
| Sulphur | 5 |
| Zinc dimethyldithiocarbamate | 5 |
| Zinc oxide | 12.5 |
| Water to adjust viscosity | 500 |
| 20's mesh sieved sawdust | 400 |

*Example 24*

| | |
|---|---|
| Hycar Type 1562 | 500 |
| 5% sodium alginate solution | 100 |
| 10% casein solution | 12.5 |
| Sulphur | 5 |
| Zinc dimethyldithiocarbamate | 5 |
| Zinc oxide | 12.5 |
| Water to adjust viscosity | 500 |
| 20's mesh granulated plastic | 600 |

*Example 25*

| | |
|---|---|
| Hycar Type 1562 | 500 |
| 5% sodium alginate solution | 100 |
| 10% casein solution | 12.5 |
| Sulphur | 5 |
| Zinc dimethyldithiocarbamate | 5 |
| Zinc oxide | 12.5 |
| Water to adjust viscosity approx. | 500 |
| 20's mesh chopped straw | 475 |

*Example 26*

| | |
|---|---|
| Hycar Type 1562 | 500 |
| 5% sodium alginate solution | 100 |
| 10% casein solution | 12.5 |
| Sulphur | 5 |
| Zinc dimethyldithiocarbamate | 5 |
| Zinc oxide | 12.5 |
| Water to adjust viscosity approx. | 500 |
| Pulverized rice husks | 550 |

The styrene co-polymer butadiene, marketed as Polysar 721, is used as the adhesive in the following examples:

*Example 27*

| | Parts by weight |
|---|---|
| Polysar 721 | 160 |
| 10% casein solution | 5 |
| Zinc diethyldithiocarbamate | 0.75 |
| Zinc 2-mercaptobenzothiazole | 1.0 |
| Sulphur | 2.25 |
| Trimene base | 1.0 |
| Zinc oxide | 3.0 |
| Water to adjust viscosity | 250 |
| 20's mesh crumb | 300 |

*Example 28*

| | Parts by weight |
|---|---|
| Polysar 721 | 160 |
| 10% casein solution | 5 |
| Zinc diethyldithiocarbamate | 0.75 |
| Zinc 2-mercaptobenzothiazole | 1.0 |
| Sulphur | 2.25 |
| Trimene base | 1.0 |
| Zinc oxide | 3.0 |
| Water to adjust viscosity approx. | 250.0 |
| 20's mesh granulated cork | 90.0 |

*Example 29*

| | |
|---|---|
| Polysar 721 | 160 |
| 10% casein solution | 5 |
| Zinc diethyldithiocarbamate | 0.75 |
| Zinc 2-mercaptobenzothiazole | 1.0 |
| Sulphur | 2.25 |
| Trimene base | 1.0 |
| Zinc oxide | 3.0 |
| Water to adjust viscosity approx. | 250.0 |
| 20's mesh sieved sawdust | 200 |

*Example 30*

| | |
|---|---|
| Polysar 721 | 160 |
| 10% casein solution | 5 |
| Zinc diethyldithiocarbamate | 0.75 |
| Zinc 2-mercaptobenzothiazole | 1.0 |
| Sulphur | 2.25 |
| Trimene base | 1.0 |
| Zinc oxide | 3.0 |
| Water to adjust viscosity approx. | 250.0 |
| 20's mesh granulated plastic | 300.0 |

*Example 31*

| | |
|---|---|
| Polysar 721 | 160 |
| 10% casein solution | 5 |
| Zinc diethyldithiocarbamate | 0.75 |
| Zinc 2-mercaptobenzothiazole | 1.0 |
| Sulphur | 2.25 |
| Trimene base | 1.0 |
| Zinc oxide | 3.0 |
| Water to adjust viscosity approx. | 250.0 |
| 20's mesh chopped straw | 225 |

*Example 32*

| | |
|---|---|
| Polysar 721 | 160 |
| 10% casein solution | 5 |
| Zinc diethyldithiocarbamate | 0.75 |
| Zinc 2-mercaptobenzothiazole | 1.0 |
| Sulphur | 2.25 |
| Trimene base | 1.0 |
| Zinc oxide | 3.0 |
| Water to adjust viscosity approx. | 250.0 |
| Pulverized rice husks | 270.0 |

In the embodiments hereinbefore described the base has been referred to as a fabric base. Suitable examples of such fabric bases are hessian, cotton scrim, paper, nylon fabric and the like. However, it is also possible to employ supports consisting of synthetic resin, leather and other relatively gas-impermeable materials depending on the purpose for which the final product is required.

It is also possible to dispense with the backing altogether, in which case however the mix must be spread on to a suitable support such as wire gauze from which it can be subsequently stripped when dry.

Thus, it can be seen that there has been defined an underlay for rugs and carpets comprising a sheet of fibrous backing material, a substantially homogeneous sheet-like mass consisting of granules of rubber crumb, said granules being bonded together by rubber from natural rubber latex dispersion in straight and branched chains and presenting a large number of intercommunicating cavities open to the atmosphere throughout the depth of said sheet-like mass, said rubber crumb granules being of a size ranging from 0.1 mm. to 3 mm. and in the proportion between 2 and 14 parts by volume of said rubber crumb to 1 part by volume of the total rubber content of the natural rubber latex, with said rubber crumb granules disposed in said sheet-like mass without settling down therein, said sheet-like mass having particles thereof extending into said fibrous backing material between the fibers thereof, said sheet-like mass being cohesively bonded to said particles.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. An underlay for rugs and carpets comprising a sheet of relatively loosely stranded fibrous backing material, a substantially homogeneous sheet-like mass on one side of said backing material consisting of granules of a size capable of passing through a 20 mesh screen bonded together by a synthetic rubber latex adhesive dispersion in straight and branched chains and presenting a large number of intercommunicating cavities open to the atmosphere throughout the depth of said sheet-like mass, said granules being disposed in said sheet-like mass without settling down therein, said sheet-like mass having particles of said dispersion and granules extending into said fibrous backing material between the fibers thereof, said sheet-like mass being cohesively bonded to said particles, said granules being of a size ranging from 0.1 mm. to 3 mm. and in the proportion between 2 and 14 parts by volume of said granules to 1 part by volume of the total synthetic rubber content of the synthetic rubber latex.

2. The underlay of claim 1 wherein said granules are formed of granulated cork.

3. The underlay of claim 1 wherein said granules are formed of sawdust.

4. The underlay of claim 1 wherein said granules are formed of granulated synthetic plastic having a specific gravity of 1.2.

5. The underlay of claim 1 wherein said granules are formed of chopped straw.

6. The underlay of claim 1 wherein said granules are formed of pulverized rice bulks.

7. The underlay of claim 1 wherein said adhesive dispersion includes chloroprene.

8. The underlay of claim 1 wherein said adhesive dispersion includes butadiene-acrylonitrile co-polymers.

9. The underlay of claim 1 wherein said adhesive dispersion includes styrene.

10. An article of manufacture comprising a substantially sheet-like mass comprising a relatively loosely stranded fibrous material sheet, and a layer of granules of rubber crumb bonded thereto on one side thereof, said granules being bonded together by rubber from synthetic rubber latex dispersion in straight and branched chains and presenting a large number of intercommunicating cavities open to the atmosphere throughout the depth of said layer, said rubber crumb granules being of a size ranging from 0.1 mm. to 3 mm. and in the proportion between 2 and 14 parts by volume of said rubber crumb to 1 part by volume of the total synthetic rubber content of the synthetic rubber latex, with said rubber crumb granules disposed in said sheet-like mass without settling down therein.

References Cited in the file of this patent

UNITED STATES PATENTS

| | | |
|---|---|---|
| 2,340,357 | Young | Feb. 1, 1944 |
| 2,629,919 | Golden | Mar. 3, 1953 |
| 2,641,296 | Marco | June 9, 1953 |
| 2,706,183 | Carter | Apr. 12, 1955 |
| 2,719,795 | Nottebohm | Oct. 4, 1955 |
| 2,882,327 | Roberts | Apr. 14, 1959 |